(12) United States Patent
Yasuda et al.

(10) Patent No.: US 7,278,623 B2
(45) Date of Patent: Oct. 9, 2007

(54) VIBRATION CONTROL UNIT AND VIBRATION CONTROL BODY

(75) Inventors: Masashi Yasuda, Amagasaki (JP);
Shohei Minbu, Amagasaki (JP);
Gongyu Pan, Amagasaki (JP);
Masataka Nakashima, Amagasaki (JP)

(73) Assignee: Tokkyokiki Corporation, Hyogo (JP)

( * ) Notice: Subject to any disclaimer, the term of this patent is extended or adjusted under 35 U.S.C. 154(b) by 0 days.

(21) Appl. No.: 10/208,310

(22) Filed: Jul. 30, 2002

(65) Prior Publication Data

US 2003/0052247 A1   Mar. 20, 2003

(30) Foreign Application Priority Data

Aug. 3, 2001   (JP) ............................. 2001-235860

(51) Int. Cl.
*F16M 13/00* (2006.01)

(52) U.S. Cl. ..................... 248/562; 248/638; 248/636

(58) Field of Classification Search ............... 248/559, 248/562, 580, 429, 618, 636, 638; 52/167.5, 52/167.6, 167.1
See application file for complete search history.

(56) References Cited

U.S. PATENT DOCUMENTS

| | | | | |
|---|---|---|---|---|
| 1,761,659 A | * | 6/1930 | Cummings | 52/167.5 |
| 2,359,036 A | * | 9/1944 | Harper | 296/35.1 |
| 3,784,146 A | | 1/1974 | Matthews | 248/358 R |
| 4,687,174 A | * | 8/1987 | Helary et al. | 248/638 |
| 4,881,350 A | * | 11/1989 | Wu | 52/167.5 |
| 5,081,806 A | * | 1/1992 | Pommelet | 52/167.5 |
| 5,261,200 A | * | 11/1993 | Sasaki et al. | 52/167.5 |
| 5,365,710 A | * | 11/1994 | Randjelovic | 52/480 |
| 5,564,237 A | * | 10/1996 | Yoneda | 52/167.5 |
| 5,599,106 A | | 2/1997 | Kemeny | 384/36 |
| 5,779,010 A | | 7/1998 | Nelson | 188/378 |

(Continued)

FOREIGN PATENT DOCUMENTS

JP   55-060739   5/1980

(Continued)

OTHER PUBLICATIONS

Japanese Office Action (Notice of Ground of Rejection) for Application No. P2002-192576; Dated Sep. 27, 2005; 4 pages.

(Continued)

*Primary Examiner*—Kimberly Wood
*Assistant Examiner*—Steven Marsh
(74) *Attorney, Agent, or Firm*—Osha Liang LLP

(57) ABSTRACT

A vibration control unit in which a rolling element having a first curved surface that is a convex surface is interposed between a first and second members, and the rolling element is allowed rolling with respect to the first member in the first curved surface thereof. The rolling element has a second curved surface that faces the first curved surface and is formed of a curved surface center different from that of the first curved surface. As the rolling element, resulting from an additional force applied on the first and second curved surfaces, rolls with respect to the first member, the second member vibrates with a restoring force determined based on an average curvature radius of the first and second curved surfaces of the rolling element and a distance between curved surface centers of the first and second curved surfaces.

7 Claims, 12 Drawing Sheets

U.S. PATENT DOCUMENTS

| | | | |
|---|---|---|---|
| 5,913,503 A * | 6/1999 | Satoh et al. | 248/636 |
| 5,918,862 A | 7/1999 | Nelson | 267/64.23 |
| 5,934,029 A * | 8/1999 | Kawai et al. | 52/167.5 |
| 6,123,313 A * | 9/2000 | Otsuka et al. | 248/580 |
| 6,443,863 B1 * | 9/2002 | Dinoffer | 473/595 |
| 6,505,806 B1 * | 1/2003 | Glaesener | 248/638 |
| 6,746,005 B1 * | 6/2004 | Su et al. | 267/140.14 |
| 6,820,380 B2 * | 11/2004 | Tsai | 52/167.4 |

FOREIGN PATENT DOCUMENTS

| | | |
|---|---|---|
| JP | 03-080132 | 8/1999 |

OTHER PUBLICATIONS

English Translation of Japanese Office Action (Notice of Ground of Rejection) for Application No. P2002-192576; Dated Sep. 27, 2005; 4 pages.

Patent Abstracts of Japan, English Translation corresponding to Publication No. 55-060739. Dated May 8, 1980; 2 pages.

* cited by examiner

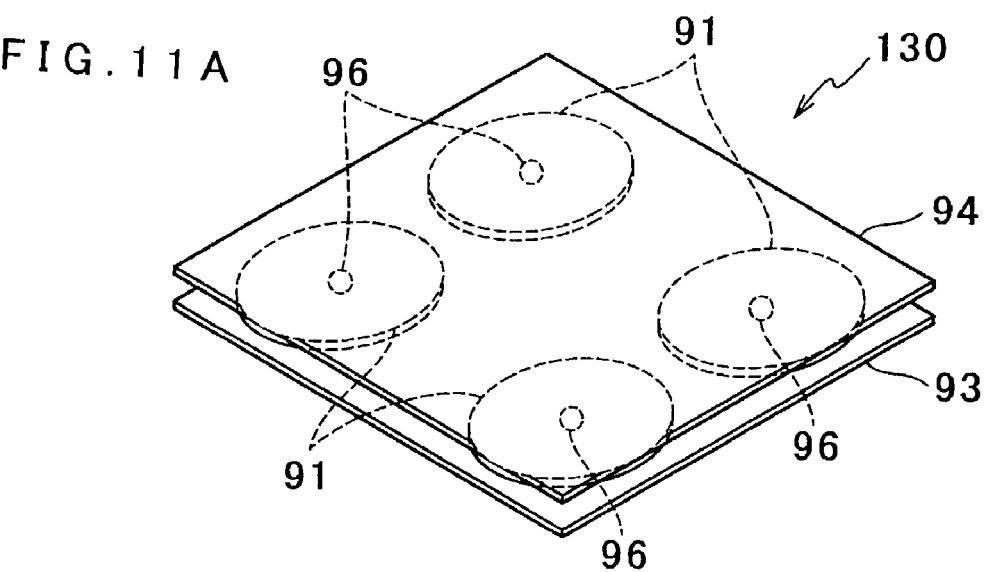
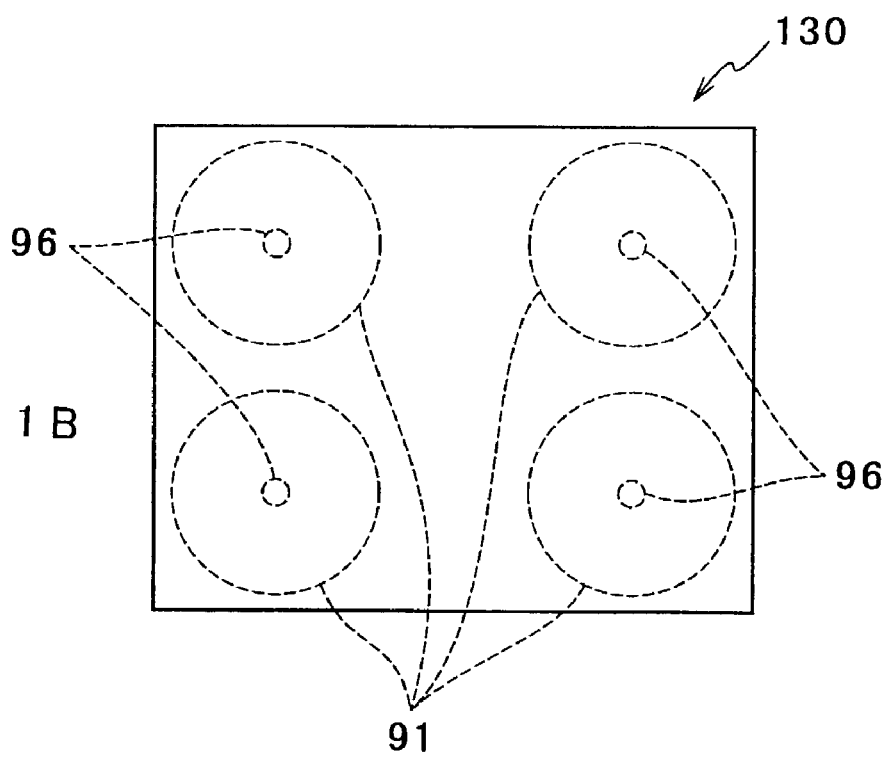
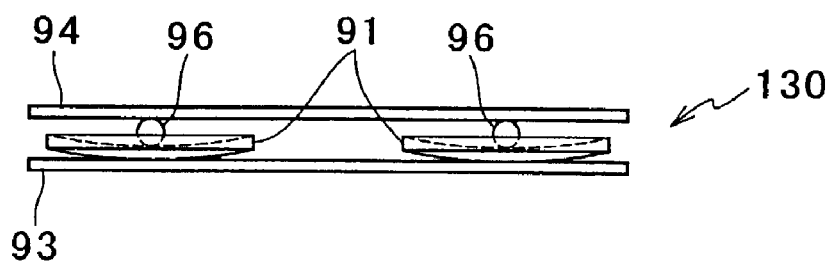

VIBRATION CONTROL UNIT AND VIBRATION CONTROL BODY

TECHNICAL FIELD OF THE INVENTION

The present invention relates to a vibration control body that is used in the field of vibration removal, vibration isolation, vibration immunity or vibration suppression, and a vibration control unit therewith.

BACKGROUND OF THE INVENTION

Semiconductor fabricating apparatus such as an exposing device and so on, and precision instruments such as an electron microscope, a three dimensional measurement device and so on, in order to fully exhibit performance thereof, are necessary to be used in a state where a minute vibration is isolated from an installation floor. Accordingly, the apparatus such as the precision instruments and so on is generally supported with a vibration removal apparatus that uses an air spring. In order to improve the performance of the vibration removal apparatus, it is necessary to reduce a characteristic frequency thereof. In order to reduce the characteristic frequency in a vertical direction (weight support direction) of the air spring, an auxiliary air reservoir of the air spring can be made larger. However, a characteristic frequency in a horizontal direction cannot be reduced with the same method. Accordingly, in order to reduce the characteristic frequency in the horizontal direction of the vibration removal apparatus, above or below the air spring, a laminate rubber that is low in rigidity in a horizontal direction is disposed. Furthermore, the laminate rubber is used in vibration immunity apparatus for suppressing swinging of structures at the earthquake, vibration suppression apparatus for absorbing the swinging of the structures and so on, and vibration isolation apparatus for isolating mechanical vibration.

However, in the laminate rubber, there are disadvantages in that when a placement-weight changes, the characteristic frequency changes, and furthermore, since a support area decreases because of shear deformation, an object that is placed is unstably supported.

SUMMARY OF THE INVENTION

Accordingly, the present invention intends to provide a vibration control body in which notwithstanding the characteristic frequency in a horizontal direction is small, even when the placement-weight changes, the characteristic frequency does not substantially change, and the placement-object is not unstably supported, and a vibration control unit including the vibration control body.

A vibration control unit according to the present invention is configured in such a way that a rolling element having a first curved surface, a convex surface, is interposed between a first member and a second member; the rolling element is capable of rolling with respect to the first member in the first curved surface; the rolling element has a second curved surface that faces the first curved surface and is formed of a curved surface center different from that of the first curved surface; and as the rolling element, resulting from a force applied on the first and second curved surfaces, rolls with respect to the first member, the second member, with a restoring force determined based on an average curvature radius of the first and second curved surfaces of the rolling element and a distance between the curved surface centers of the first and second curved surfaces, may vibrate.

In the above configuration, the second curved surface of the rolling element may be formed in a convex surface or in a concave surface. When the second curved surface of the rolling element is the convex surface, the second curved surface may directly come into contact with the second member, or may indirectly, through another member (an intermediate body), come into contact with the second member. Furthermore, when the second curved surface of the rolling element is concave surface, the second curved surface is preferable to indirectly, through another member (an intermediate body), come into contact with the second member. Still furthermore, in the vibration control unit according to the present invention, from above in turn, the second member, (the intermediate body), the rolling element (the intermediate body), and the second member may be disposed. Furthermore, the rolling element may be capable of vibrating with respect to the first member in two directions that intersect each other in a horizontal plane, or may be capable of vibrating in any one direction alone in the horizontal plane. In the vibration control unit of the present invention, the first and second members may not be contained.

In the vibration control unit according to the present invention configured as mentioned above, resulting from the added force (assumed to have both components of an axial force and a shearing force) that the first or second member inflicts on the rolling element, a restoring force (torque) develops in a direction opposite to a direction of the torque that accompanies an action of the shearing force. As a result, the first or second member vibrates so as to restore to an equilibrium point. The restoring force is determined solely by a shape of the rolling element including shapes of the first and second curved surfaces, and becomes a factor that determines the characteristic frequency. Accordingly, by adjusting only the shape of the rolling element, the characteristic frequency in a horizontal direction can be made smaller to a desired value, and even when a mass of an object to be placed on the first member or second member may change, the characteristic frequency does not substantially change. Accordingly, without depending on the mass of the object that is placed on the first or second member, an identical vibration control effect can be always obtained.

Furthermore, according to the present invention, the rolling element can be configured, not of an elastic body such as the laminate rubber, only of a material having high stiffness. Accordingly, the rolling element does not substantially undergo the shear deformation and the object being placed thereon can be stably supported.

Even when, other than placing a mass body on the second member, a spring force is added to the second member, similarly to the case when the mass body is placed, an axial force can be added to the rolling element. Thereby, as a force-transmitting element of a horizontal actuator, it plays a role of a header that transmits the axial force but is soft for the shear.

The vibration control unit according to the present invention may be one in which the second curved surface is a convex surface, and the rolling element is capable of rolling with respect to the first member in the first curved surface, and at the same time is capable of rolling with respect to the second member in the second curved surface. Thereby, there is an advantage in that the vibration control unit may be constituted only of the rolling element.

The vibration control unit according to the present invention may be one in which the second curved surface is a convex surface, and between the second member and the rolling element, an intermediate body that is capable of rolling or sliding with respect to the second curved surface is interposed. Since, by the use of the intermediate body, the characteristic frequency depends also on the shape of the intermediate body, the characteristic frequency can be determined with more flexibility.

For the intermediate body to slide with respect to the second curved surface, a contact surface with the intermediate body of the second member is necessary to be a concave surface. In this case, the intermediate body is formed in convex surface in both contact surfaces with the rolling element and with the second member, and has an effect similar to the rolling element.

Furthermore, the intermediate body may be one or plurality. Even when there is a plurality of the intermediate bodies, similarly to the case where the intermediate body slides with respect to the second curved surface, the contact surface with the intermediate body of the second member is necessary to be a concave surface, and the plurality of intermediate bodies having different diameters is necessary to be combined so that each of the plurality of the intermediate bodies may follow the curved surface.

The present invention relates to a vibration control body from a different viewpoint. The vibration control body is formed so as to have a overall height of H, and so that the first and second curved surfaces that are convex surfaces that face each other may satisfy $R1+R2>H>h$ ($R1$ and $R2$, respectively, denote average curvature radii of the first and second curved surfaces, and h denotes a distance between curved surface centers of the first and second curved surfaces).

The vibration control body configured as mentioned above, when disposed with the second curved surface as a bottom surface, resulting from an axial force and shearing force that are applied from the member that comes into contact relatively movably with the first or second curved surface, generates a restoring force (torque) in a direction opposite to a direction of the torque accompanying an action of the shearing force, resulting in vibrating with a predetermined characteristic frequency. The characteristic frequency thereof is determined solely by the shape of the vibration control body including the shape of the first and second curved surfaces. Accordingly, by adjusting only the shape of the vibration control body, the characteristic frequency in a horizontal direction can be made smaller to a desired value, and even when a mass of an object to be placed thereon may change, the characteristic frequency does not substantially change. Accordingly, without depending on the mass of the object that is placed thereon, an identical vibration control effect can be always obtained.

Furthermore, the vibration control body can be configured, not of an elastic body such as the laminate rubber, only of a material having high stiffness. Accordingly, since the vibration control body does not substantially undergo the shear deformation, the object to be placed thereon can be stably supported.

The vibration control body according to the present invention may be a spherical surface that is formed symmetrically with respect to a central axis and at both ends of the central axis so that the first and second curved surfaces may satisfy $R1+R2>H>h$ ($R1$ and $R2$, respectively, denote radii of the first and second curved surfaces, and h denotes a distance between curved surface centers of the first and second curved surfaces). Thereby, since the shapes of the first and second curved surfaces are formed spherically, design and manufacture thereof can be relatively easily performed.

The vibration control body mentioned above may have an area where a curvature radius of any one of the first and second curved surfaces increases continually as goes far from the central axis. According to this, since when a tilt angle of the vibration control body becomes larger, a larger restoring force can be generated, in comparison with the case where a stroke is limited to a smaller one with a stopper, the vibration control body is less deteriorated in its performance.

Furthermore, the vibration control unit of the present invention is one in which at least the second curved surface of the first and second curved surfaces of the one or the plurality of vibration control bodies that are the aforementioned vibration control bodies is supported with a plate-like member. From a different viewpoint, the vibration control unit according to the present invention is one in which one or a plurality of vibration control bodies that are serially disposed, each of which being the vibration control body as mentioned above, and at least two plate-like members are alternately disposed with the plate-like members as both ends and so that each of the vibration control bodies may be supported by each of the plate-like members in the first and second convex surfaces. According to such configuration, the vibration control body, as one unit together with the plate-like members, can be simply installed at a desired place.

Portions that come into contact with the first and second curved surfaces of the plate-like member may be a flat surface or concave surface. In these vibration control units, the vibration control body, with respect to the plate-like member, may be capable of vibrating in two directions that intersect each other in the horizontal plane or only in any one of directions therein.

Furthermore, from other viewpoint, the vibration control body of the present invention is formed so as to have a thickness t at a center portion and a first curved surface, a concave surface, and a second curved surface, a convex surface, which face to each other. Here, the first and second curved surfaces are formed so as to satisfy $(R2-R1)>t$ ($R1$ and $R2$, respectively, denote average curvature radii of the first and second curved surfaces).

Since the vibration control body is configured as mentioned above, resulting from the axial force and shearing force inflicted from the member that comes into contact relatively movably with the first or second curved surface, the restoring force (torque) is generated in a direction opposite to a direction of the torque accompanying an action of the shearing force, resulting in vibrating with a predetermined characteristic frequency. The characteristic frequency thereof is determined solely by the shape of the vibration control body including the shapes of the first and second curved surfaces. Accordingly, by adjusting only the shape of the vibration control body, the characteristic frequency in a horizontal direction can be made smaller to a desired value, and even when a mass of an object to be placed thereon may change, the characteristic frequency does not substantially change. Accordingly, without depending on the mass of the object that is placed thereon, an identical vibration control effect can be always obtained. Furthermore, the vibration control body may be configured, not of an elastic body such as a laminate rubber, but solely of a material having high stiffness. Accordingly, the vibration control body does not substantially undergo the shear deformation, and an object to be placed thereon can be supported with stability.

Still furthermore, the vibration control unit of the present invention includes one or a plurality of vibration control bodies, each of which being the aforementioned vibration control body; an intermediate body that is disposed so as to come into contact with the first curved surface; and plate-like members that sandwich the vibration control body and the intermediate body so that the intermediate body may roll or slide with respect to the first curved surface. In the above, the vibration control body is allowed to slide with respect to the plate-like member that comes into contact with the vibration control body in the second curved surface. From other viewpoint, the vibration control unit according to the present invention is one in which a complex body of intermediate body and vibration control body in which the intermediate body is disposed so as to come into contact with the first curved surface of one or a plurality of vibration control bodies that is serially disposed, each of which being the vibration control body as mentioned above, and at least two plate-like members are alternately disposed with the plate-like members as both ends and so that the vibration control body may roll with respect to the plate-like members that come into contact with the vibration control body in the second curved surface. According to such configuration, the vibration control body, as one unit together with the plate-like members, can be simply installed at a desired place.

Portions that come into contact with the first and second curved surfaces of the plate-like member may be flat surfaces or concave surfaces. Furthermore, the intermediate body may be one or plurality. In these vibration control units, the vibration control body may be capable of vibrating with respect to the plate-like member in two directions that intersect each other in a horizontal plane, or only in any one of directions in the horizontal plane.

The above vibration control unit may be one in which between the two plate-like members, three or more of the vibration control units having the same height are disposed in parallel. According to this, owing to the arrangement of three or more vibration control bodies having the same height, a stable support surface that has a flat surface in parallel with a flat surface that an object being placed forms can be constituted.

In the vibration control unit, further outside of the plate-like members that are disposed at endmost portions, a vibration control mechanism for dampening vibration transmission in an axial direction of the vibration control body may be disposed. According to this, a characteristic frequency in a vertical direction as well as in a horizontal direction can be lowered. That is, in the nature of things, although the vibration control body is designed so as to exhibit characteristics of a rigid body in an axial direction, when the vibration control mechanism (for instance, an elastic body in an axial direction) is disposed through a plate-like member, the isolation characteristics can be given also to a vertical direction.

Still furthermore, although an ordinary elastic body deforms not only in an up and down direction but also in a rotation direction, when a stable supporting surface as the above configuration in which in particular, three or more vibration control bodies having the same height are disposed in parallel is configured, based on the configuration in which the vibration control mechanism for dampening the vibration transmission in an axial direction is disposed further outside of the plate-like members that are disposed at endmost portions, an ordinary elastic body such as an air spring or a coil spring may be disposed in series with the vibration control body, resulting in realizing a stable three-dimensional supporting mechanism.

In the vibration control unit as mentioned above, an auxiliary member that generates a restoring force in a direction opposite to a direction in which a shearing force acts on the first or second curved surface may be disposed. According to this, since when the tilt angle of the vibration control body becomes larger, a larger restoring force can be generated, in comparison with the case where the stroke is limited to a smaller one with the stopper, the vibration control body is less deteriorated in its performance.

It is needless to say that the above vibration control unit can be used in any one of vibration removal apparatus, vibration insulation structure of vibration generator, vibration immunity apparatus or vibration suppression apparatus. In addition to this, the vibration control unit can be used also as a supporting mechanism of these apparatuses including active control.

Other and further objects, features and advantages of the invention will appear more fully from the following description taken in connection with the accompanying drawings.

BRIEF DESCRIPTION OF THE DRAWINGS

FIG. 11A is a perspective view of a vibration control unit according to a twelfth embodiment of the present invention.

FIG. 11B is a plan view of a vibration control unit according to a twelfth embodiment of the present invention.

FIG. 11C is a side view of a vibration control unit according to a twelfth embodiment of the present invention.

DESCRIPTION OF THE PREFERRED EMBODIMENTS

In the following, preferred embodiments of the present invention will be explained with reference to the drawings.

Figure 1:
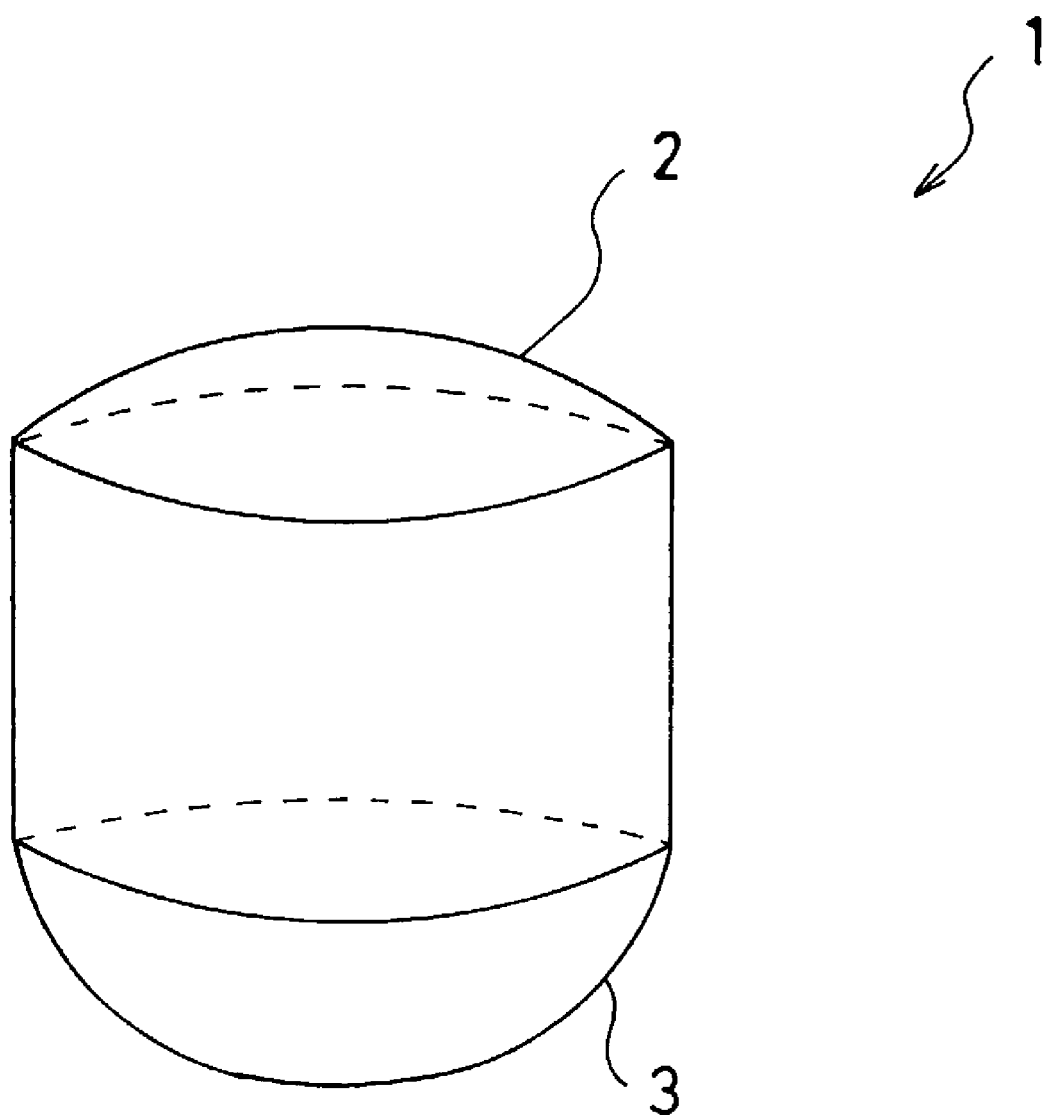
FIG. 1 is a perspective view of a vibration control body according to a first embodiment of the present invention.
Figure 2:
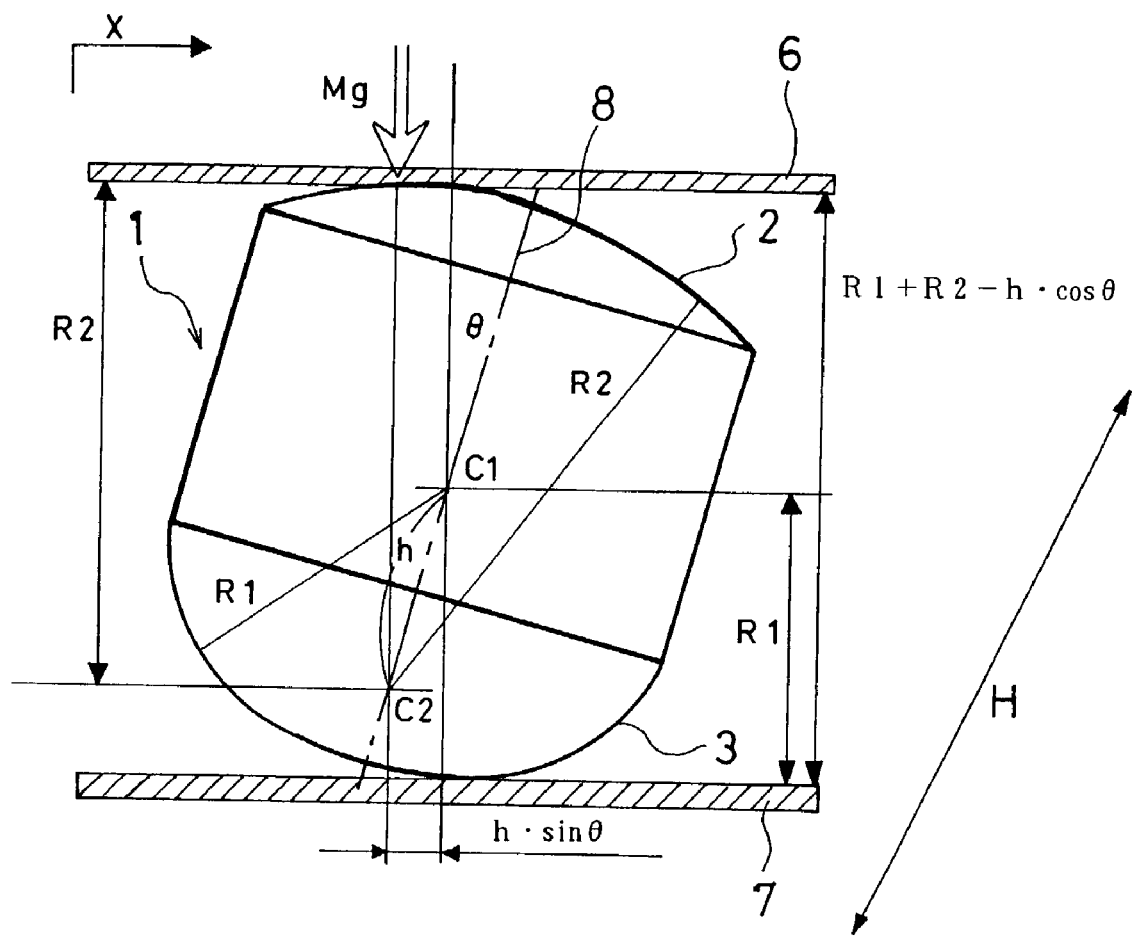
FIG. 2 is a longitudinal sectional view of the vibration control body shown in FIG. 1.

FIG. 1 is a perspective view of a vibration control body according to a first embodiment of the present invention. FIG. 2 is a longitudinal sectional view of the vibration control body shown in FIG. 1. The vibration control body 1 shown in FIG. 1 and FIG. 2 has a shape in which two end surfaces 2, 3 of a cylinder project outside to be convex spherical surfaces. The vibration control body 1, at the use thereof, is disposed with an end surface 3 whose radius is smaller (hereinafter referred to as a bottom end surface) downward and with an end surface 2 whose radius is larger (hereinafter referred to as a top end surface) upward. The vibration control body 1, as will be described later, can be used as vibration removal apparatus, vibration immunity apparatus or vibration suppression apparatus, or part thereof.

The vibration control body 1 is formed so as to have an overall height H and so as to be axisymmetric with respect to a central axis 8 that has the top end surface 2 and the bottom end surface 3 at both ends thereof. Accordingly, both a center C2 of a spherical surface that constitutes the top end surface 2 and a center C1 of a spherical surface that constitutes the bottom end surface 3 are on the central axis 8. Furthermore, the overall height H of the vibration control body 1 is formed so as to be smaller than a sum of a radius R2 of the top end surface 2 and a radius R1 of the bottom end surface 3 (R1+R2>H). Accordingly, the center C2 of the spherical surface that constitutes the top end surface 2 is located below the center C1 of the spherical surface that constitutes the bottom end surface 3, and both centers are offset by a distance h=R1+R2−H. Between these, the following relation holds, R1+R2>H>h. R1 may be equal to R2.

As shown in FIG. 2, a top surface plate 6 disposed level is in contact with the top end surface 2 of the vibration control body 1, a bottom surface plate 7 disposed level is in contact with the bottom end surface 3, and an object having a mass M is placed on the top surface plate 6 and the bottom surface plate 7 is fixed to a floor. At this time, the vibration control body 1, a rolling element, rolls on the bottom end surface 3 with respect to the bottom surface plate 7 and rolls on the top end surface 2 with respect to the top surface plate 6. When the object having a mass M on the top surface plate 6 moves in a horizontal direction, a travel distance x is expressed by the following formula (1) with θ as a tilt angle of the vibration control body 1. At this time, when the object having a mass M is supported with a plurality of vibration control bodies having a height H, since the object having a mass M performs only a translational movement due to disturbance, the object having a mass M is not caused to rotate and does not affect on a movement of the vibration control body 1.

$$x = R1 \cdot \theta + R2 \cdot \theta - h \cdot \sin\theta \quad (1)$$

When the object having a mass M on the top surface plate 6 is moved in a horizontal direction, since a contact point (a point of action of weight) between the top end surface 2 and the top surface plate 6 shifts in a horizontal direction from a contact point between the bottom end surface 3 and the bottom surface plate 7, a restoring moment that makes the tilt thereof smaller acts on the vibration control body 1. When the tilt angle of the vibration control body 1 is θ, a magnitude of a restoring moment that is applied on the vibration control body 1 becomes M×g×h×sin θ, a magnitude of a force that acts on the object having a mass M becomes (M×g×h×sin θ)/(R1+R2−h×cos θ). Accordingly, a balance of forces applied on the object having a mass M and disposed on the top surface plate 6 becomes as shown in the following Formula (2).

$$M \frac{d^2 x}{dt^2} + \frac{Mgh\sin\theta}{R1 + R2 - h\cos\theta} = 0 \quad (2)$$

In the following, a characteristic frequency in a horizontal direction of the vibration control body 1 will be obtained. First, by utilizing Formula (1), second order differential of x with t is obtained in the following procedure of Formulas (3) to (6).

$$\frac{dx}{dt} = \frac{d\theta}{dt} \cdot \frac{dx}{d\theta} \quad (3)$$

$$\frac{dx}{dt} = \frac{d\theta}{dt} \cdot (R1 + R2 - h\cos\theta) \quad (4)$$

$$\frac{d^2 x}{dt^2} = (R1 + R2 - h\cos\theta) \cdot \frac{d^2\theta}{dt^2} + \frac{d\theta}{dt} \cdot \left(h\sin\theta \frac{d\theta}{dt}\right) \quad (5)$$

$$\frac{d^2 x}{dt^2} = (R1 + R2 - h\cos\theta) \cdot \frac{d^2\theta}{dt^2} \quad (6)$$

In transforming formula (5) into formula (6), relationship of formula (7) is utilized.

$$\frac{d\theta}{dt} \cdot \frac{d\theta}{dt} = 0 \quad (7)$$

dθ/dt×dθ/dt is a higher order term and it can be omitted. However, formula (7) shows that dθ/dt is equal to zero. In fact, formula (7) is an approximate formula.

In substituting formula (6) for formula (2), $$(R1 + R2 - h\cos\theta) \cdot \frac{d^2\theta}{dt^2} + \frac{gh\sin\theta}{R1 + R2 - h\cos\theta} = 0 \quad (8)$$

is obtained. Here, assuming the case where the tilt angle θ of the vibration control body 1 is very small, that is, minute vibration, the approximation, sin θ=θ and cos θ=1, is made. Then, the formula (8) can be expressed by $$\frac{d^2\theta}{dt^2} + \frac{gh}{(R1 + R2 - h)^2} \cdot \theta = 0 \quad (9)$$

A general solution obtained from a dynamic equation (9) expresses a natural vibration and a characteristic frequency f in a horizontal direction thereof can be expressed with the following formula (10) or formula (11).

$$f = \frac{1}{2\pi} \cdot \sqrt{\frac{gh}{(R1 + R2 - h)^2}} \quad (10)$$

$$f = \frac{1}{2\pi \cdot H} \cdot \sqrt{g(R1 + R2 - H)} \qquad (11)$$

As obvious from formula (10) or (11), a characteristic frequency f in a horizontal direction of the object having a mass M is determined by radii R2 and R1 of the top end surface 2 and bottom end surface 3 and an overall height H, and does not depend on the mass M. Accordingly, by appropriately determining the shape of the vibration control body 1, the characteristic frequency f of the vibration control body 1 can be set at smaller values. Thereby, the vibration control body 1 becomes to exhibit an excellent vibration isolation effect, that is, when the bottom surface plate 7 is vibrated, the top surface plate 6 can be made smaller in its swinging.

In particular, in the case of the vibration control body 1 of the present embodiment, as obvious when referring to the formula (10) that expresses the characteristic frequency f, by making h smaller, without making the vibration control body 1 itself so large, the characteristic frequency f thereof can be made smaller. Accordingly, a space necessary for the vibration control body 1 can be made relatively smaller. In addition, the characteristic frequency f that is thus set does not change even when a mass of an object that is placed on the vibration control body 1 changes. Accordingly, by applying the vibration control body 1 to the vibration removal apparatus, vibration immunity apparatus, and vibration suppression apparatus, without depending on the mass of the object placed thereon, the identical vibration suppression effect can be always expected.

Furthermore, since the vibration control body 1 can be configured solely of a material having high stiffness such as stainless steel rather than the laminate rubber, it does not substantially undergo shearing deformation and can support the object placed thereon with stability.

Still furthermore, according to the present embodiment, since, different from one that is later described in eighth embodiment in which a convex surface and a concave surface are combined, both the top end surface 2 and the bottom end surface 3 are formed in convex surface, there is an advantage in that the vibration control unit can be configured only with the vibration control body 1 that is a rolling element.

As a modified example of the present embodiment, the vibration control body 1 may be one in which at least either one of the top end surface 2 or the bottom end surface 3 may have, not a spherical surface, but an area where the curvature radius thereof increases continuously as departs from the central axis 8. By thus implementing, since when the tilt angle of the vibration control body 1 becomes larger, a larger restoring force can be generated, when compared with the case where the stroke is limited to a smaller one by use of, for instance, a stopper, the performance of the vibration control body 1 is less deteriorated. In addition, although the vibration control body 1 is capable of vibrating in two or more arbitrary directions in a horizontal plane, it may be formed so as to vibrate in only one direction in a horizontal plane. When the vibration control body 1 is allowed vibrating in only one direction in a horizontal plane, by combining a plurality thereof, a vibration in two or more arbitrary directions in a horizontal plane can be realized.

The vibration control body 1, other than it can be used as a simple body thereof, may be configured also as one vibration control unit including the top surface plate 6 and the bottom surface plate 7.

Next, a second embodiment of the present invention will be explained with reference to FIG. 3. The present embodiment relates to a vibration control unit including a vibration control body similar to the vibration control body 1 as explained in FIG. 1. The vibration control unit 20 shown in FIG. 3 includes a vibration control body 21 both of which top end surface 22 and bottom end surface 23 project outside and form spherical surfaces. The vibration control body 21 is formed in a cylindrical shape having a relatively large diameter and configured of a base portion 21a that continues into the bottom end surface 23 and a projection portion 21b that projects concentrically from the base portion 21a so as to have a diameter smaller than that of the base portion 21a and continues into the top end surface 22.

A shape of the vibration control body 21 satisfies the relationships similar to those of the vibration control body 1 according to the first embodiment. That is, a radius of the top end surface 22 is larger than that of the bottom end surface 23, and an overall height of the vibration control body 21 is set smaller than a sum of the radius of the top end surface 22 and that of the bottom end surface 23. Accordingly, also for the vibration control body 21, the formulas (1) through (11) hold, and benefits identical to that of the vibration control body 1 according to the first embodiment can be obtained.

Figure 3:
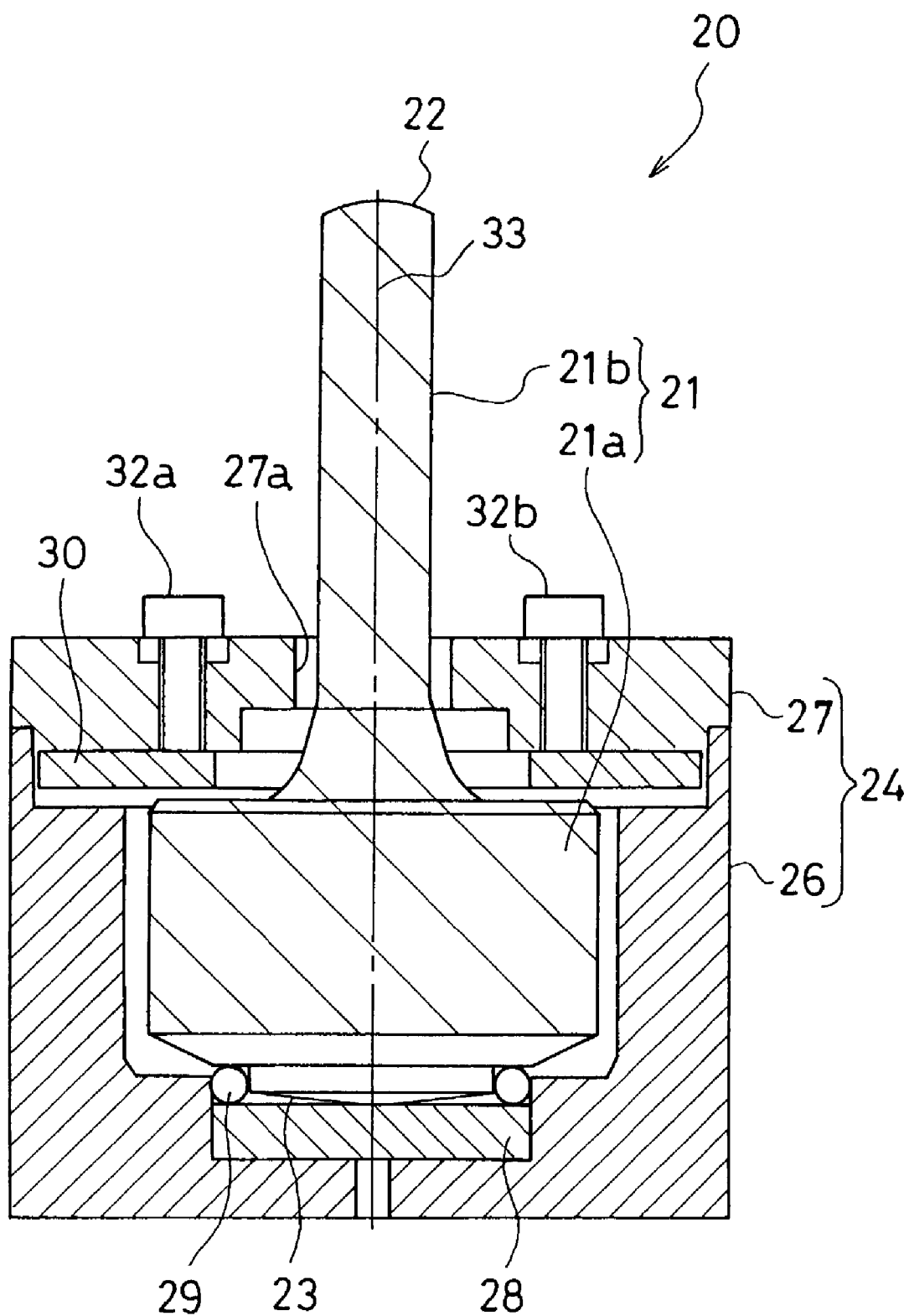
FIG. 3 is a longitudinal sectional view of a vibration control unit according to a second embodiment of the present invention.

As shown in FIG. 3, in the vibration control unit 20 according to the present embodiment, the base portion 21a of the vibration control body 21 and a lower side portion of the projection portion 21b are accommodated in a housing 24, and an upper portion of the projection portion 21b is projected from an opening 27a bored in a top surface of the housing 24. A little gap is disposed between an inner periphery surface of the housing 24 and the vibration control body 21, and the vibration control body 21 is allowed making minute vibration inside of the housing 24 in a horizontal direction.

The housing 24 is made of a bottom housing 26 having a concavity that accommodates the base portion 21a of the vibration control body 21, and a top housing 27 that is disposed on the bottom housing 26 and has the opening 27a. On a concavity bottom surface of the bottom housing 26, a plate-like member 28 that is made of a high stiffness material and comes into contact with the bottom end surface 23 of the vibration control body 21 is disposed. Furthermore, an O-ring 29 is disposed between a periphery of the plate-like member 28 and the bottom end surface 23. The O-ring 29, when shearing force is inflicted on the vibration control body 21 and a central axis 33 is made to tilt from a vertical axis, generates a restoring force in a direction opposite to a direction of the shearing force so as to restore the central axis 33 to the vertical direction.

A stopper plate 30 is disposed between a bottom surface of the top housing 27 and a top surface of the base portion 21a of the vibration control body 21. A position in an up and down direction of the stopper plate 30 can be adjusted by use of bolts 32a and 32b that are used to screw together the top housing 27. By adjusting the position in an up and down direction of the stopper plate 30, an amount of allowance in the upside of the base portion 21a can be adjusted.

For the vibration control unit 20 shown in FIG. 3, at the use thereof, the bottom housing 26 is fixed to a floor or a base, and instrument, structures and vibration suppression mass body are disposed on the top end surface 22 of the projection portion 21b. At this time, the vibration control unit 20, since the vibration control body 21 is accommodated in the housing 24, can be simply disposed at a desired place. In addition, since the O-ring is disposed inside the housing 24, when the tilt angle of the vibration control body 21 becomes larger, a larger restoring force can be generated. Accordingly, compared with the case where the stroke is limited to a smaller one by use of, for instance, a stopper, the vibration control body 21 is less deteriorated in its performance.

Next, a third embodiment of the present invention will be explained with reference to FIG. 4. The present embodiment relates to a vibration control unit including a vibration control body similar to the vibration control body 1 explained in FIG. 1. A vibration control unit 40 shown in FIG. 4 includes a substantially cylindrical vibration control body 41 both of which top end surface 42 and bottom end surface 43 project outside and form convex spherical surfaces.

A shape of the vibration control body 41 satisfies relationship similar to those of the vibration control body 1 according to the first embodiment. That is, a radius of the top end surface 42 is larger than that of the bottom end surface 43, and an overall height of the vibration control body 41 is set smaller than a sum of the radius of the top end surface 42 and that of the bottom end surface 43. Accordingly, also for the vibration control body 41, the formulas (1) through (11) hold, and benefits identical to those of the vibration control body 1 according to the first embodiment can be obtained.

Figure 4:
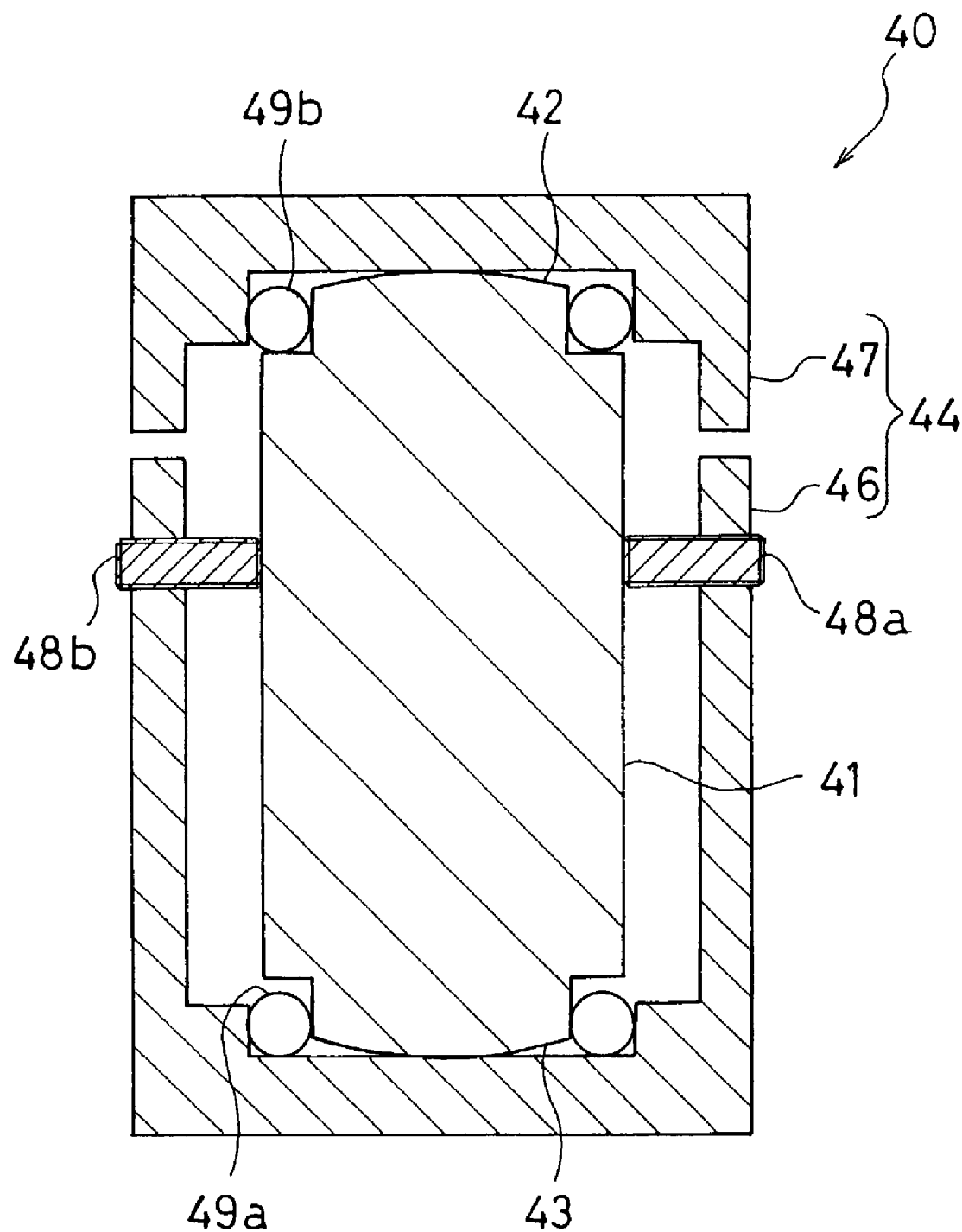
FIG. 4 is a longitudinal sectional view of a vibration control unit according to a third embodiment of the present invention.

As shown in FIG. 4, in the vibration control unit 40 according to the present embodiment, an entirety of the vibration control body 41 is accommodated in a housing 44. Although a relatively broad gap is disposed between an inner periphery surface of the housing 44 and the vibration control body 41, owing to two support bars 48a and 48b, the vibration control body 41 is supported from side surfaces. Accordingly, the vibration control body 41 is allowed making minute vibration in a horizontal direction inside of the housing 44.

The housing 44 is configured of a bottom housing 46 having a concavity that accommodates larger part of the vibration control body 41 excluding a neighborhood of a top portion thereof, and a top housing 47 that is disposed on the bottom housing 46 and has a concavity. A bottom surface of the concavity of the bottom housing 46 and a top surface of the concavity of the top housing 47, respectively, come into contact with the bottom end surface 43 and top end surface 42 of the vibration control body 41. Furthermore, an O-ring 49a is disposed between a periphery of the bottom end surface 43 of the vibration control body 41 and the bottom surface of the concavity of the bottom housing 46, and an O-ring 49b is disposed between a periphery portion of the top end surface 42 and a top surface of the concavity of the top housing 47. These O-rings 49a and 49b, when shearing force is inflicted on the vibration control body 41 and a central axis (not shown in the drawing) is made to tilt from a vertical axis, generates a restoring force in a direction opposite to a direction of the shearing force so as to restore the central axis toward the vertical direction.

The vibration control unit 40 shown in FIG. 4, at the use thereof, is fixed to a floor or a base through the bottom housing 46, and instrument, a structure and a vibration suppression mass body are disposed on the top housing 47. At this time, since the vibration control body 41 is accommodated in the housing 44, the vibration control unit 40 can be simply disposed at a desired place. In addition, since the O-rings 49a and 49b are disposed, when the tilt angle of the vibration control body 41 becomes larger, a larger restoring force can be generated. Accordingly, compared with the case where the stroke is limited to a smaller one by use of, for instance, a stopper, deterioration of performance of the vibration control body 41 is less.

Figure 5:
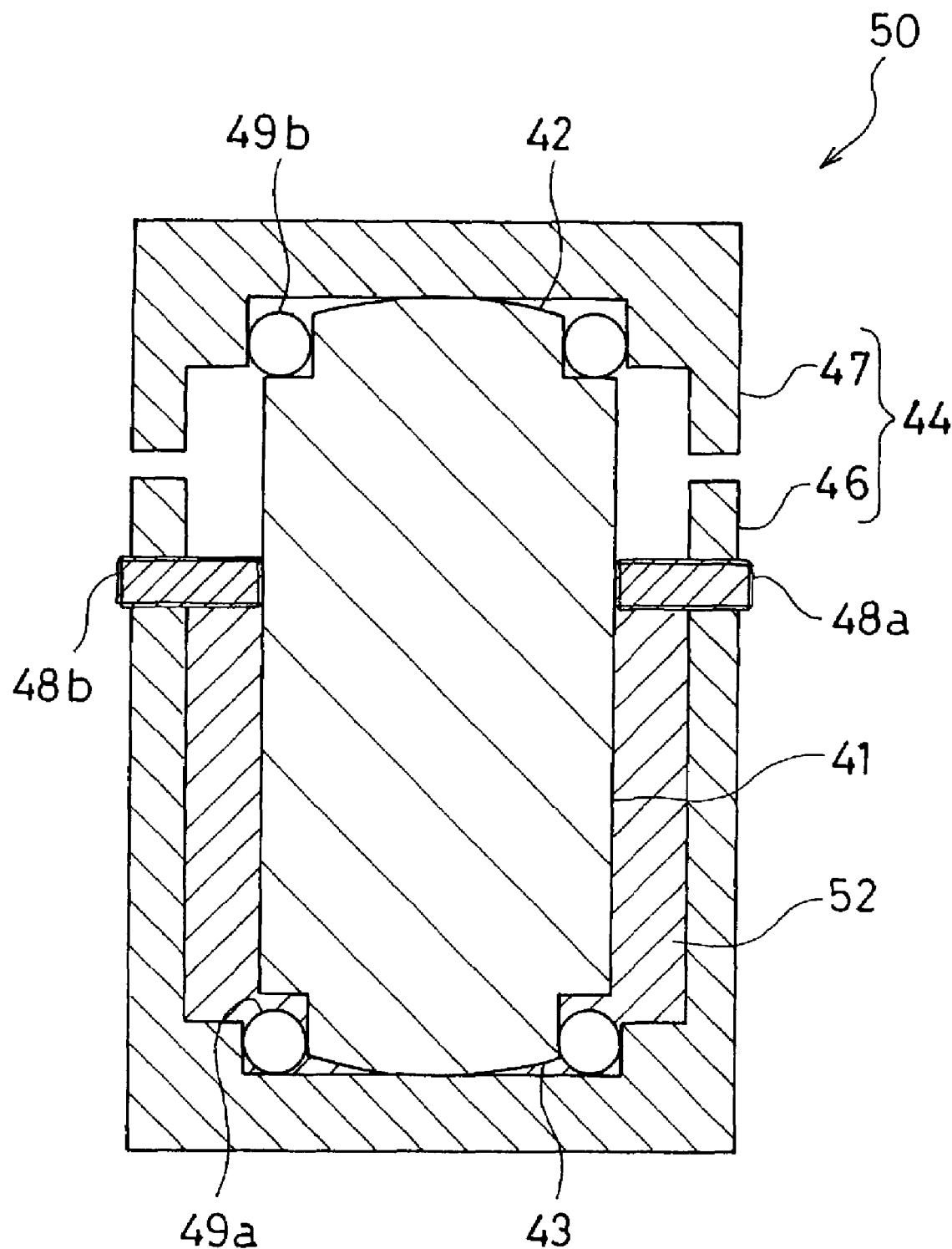
FIG. 5 is a longitudinal sectional view of a vibration control unit according to a fourth embodiment of the present invention.

Next, a fourth embodiment of the present invention will be explained with reference to FIG. 5. In FIG. 5, members similar to FIG. 4 are given common reference numerals and detailed explanations thereof are omitted. As shown in FIG. 5, a vibration control unit 50 according to the present embodiment is different from the vibration control unit 40 according to the third embodiment explained in FIG. 4 only in that silicone oil 52 is filled in a gap between a portion lower than support bars 48a and 48b of a bottom housing 46 and a vibration control body 41. Accordingly, the vibration control unit 50 has benefits due to the vibration control unit 40 according to the third embodiment and also a benefit in that an attenuation effect of vibration is larger than in the case of the third embodiment.

Figure 6:
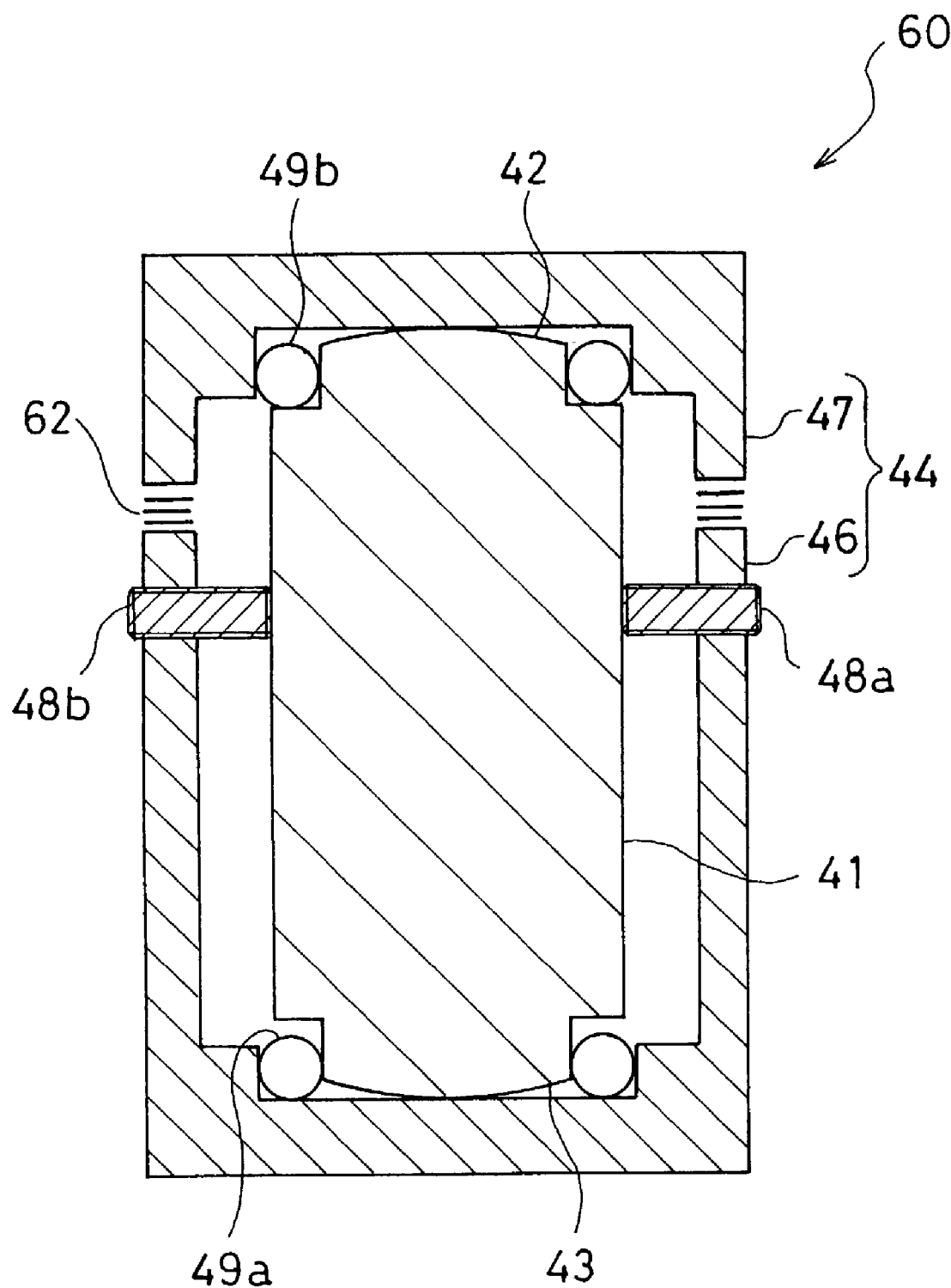
FIG. 6 is a longitudinal sectional view of a vibration control unit according to a fifth embodiment of the present invention.

Next, a fifth embodiment of the present invention will be explained with reference to FIG. 6. In FIG. 6, members similar to FIG. 4 are given common reference numerals and detailed explanations thereof are omitted. As shown in FIG. 6, a vibration control unit 60 according to the present embodiment is different from the vibration control unit 40 according to the third embodiment explained in FIG. 4 only in that a viscous body 62 such as rubber or gel is disposed so as to fill a gap between a bottom housing 46 and a top housing 47. Accordingly, the vibration control unit 60 has benefits due to the vibration control unit 40 according to the third embodiment and also benefits in that an attenuation effect of vibration is larger than in the case of the third embodiment and dust can be hindered from entering into a housing 44.

Figure 7A:
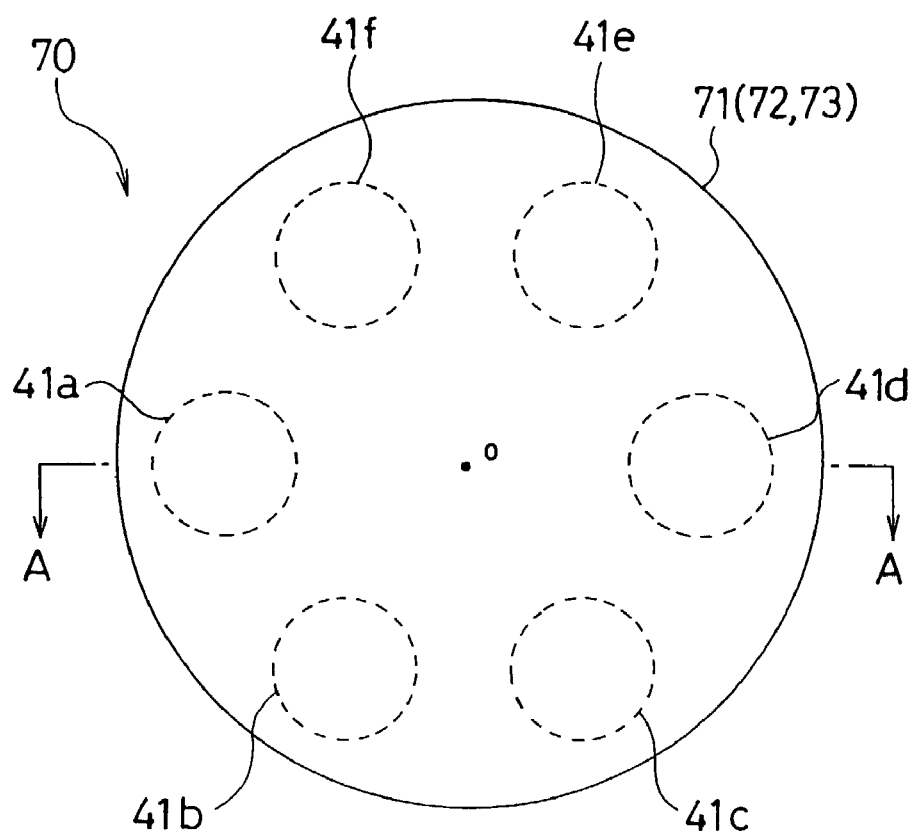
FIG. 7A is a plan view of a vibration control unit according to a sixth embodiment of the present invention.
Figure 7B:
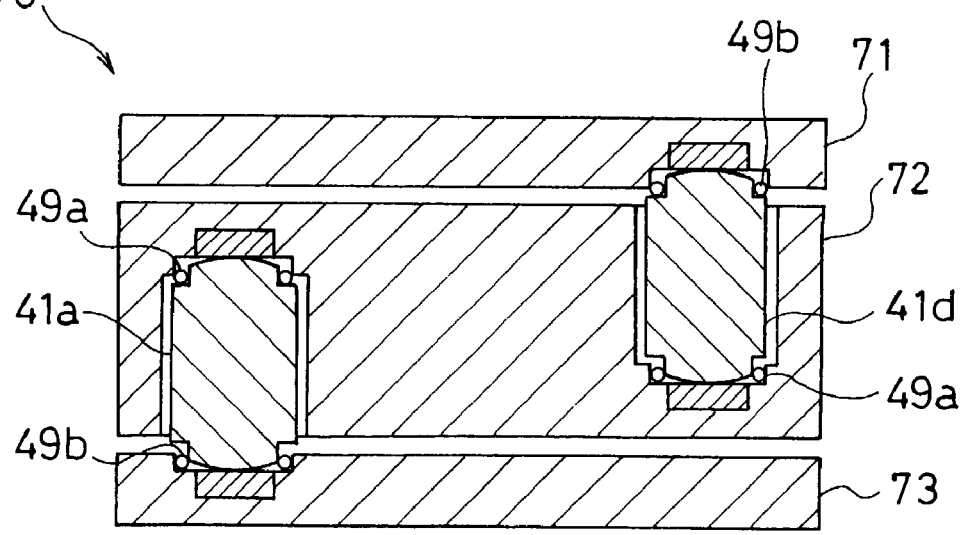
FIG. 7B is a longitudinal sectional view of a vibration control unit according to a sixth embodiment of the present invention.

Next, a sixth embodiment of the present invention will be explained with reference to FIGS. 7A and 7B. FIG. 7A is a plan view of a vibration control unit according to the present embodiment, and FIG. 7B is a sectional view along an A-A line of FIG. 7A. A vibration control unit 70 shown in FIGS. 7A and 7B includes relatively thin top and bottom discs 71 and 73, a relatively thick disc 72 interposed therebetween, and six vibration control bodies 41a to 41f interposed between these three concentrically disposed discs 71 through 73.

Among six vibration control bodies 41a through 41f, the vibration control bodies 41a, 41c and 41e are interposed between two lower-side discs 72 and 73 and top end surfaces and bottom end surfaces thereof are supported by the discs 72 and 73, respectively, and the vibration control bodies 41b, 41d and 41f are interposed between two upper-side discs 71 and 72 and top end surfaces and bottom end surfaces are supported by the discs 71 and 72, respectively. Three vibration control bodies 41a, 41c and 41e that are interposed between two discs 72 and 73 are disposed in parallel and at positions having the same distance from a center O of the discs 72 and 73 so that lines connecting the respective vibration control bodies 41a, 41c and 41e and the center O of the discs 72 and 73 may form an angle of 120 degree from each other. On the other hand, three vibration control bodies 41b, 41d and 41f that are interposed between two discs 71 and 72 are disposed in parallel and at positions having the same distance from the center O of the discs 72 and 73 so that lines connecting the respective vibration control bodies 41b, 41d and 41f and the center O of the discs 72 and 73 may form an angle of 120 degree from each other. Three vibration control bodies 41a, 41c and 41e and three vibration control bodies 41*b*, 41*d* and 41*f* are disposed so that both groups may not superpose with each other, and respective lines connecting these vibration control bodies 41*a* through 41*f* and the center O may form an angle of 60 degree from neighboring ones. At top and bottom end surfaces of each of six vibration control bodies 41*a* through 41*f*, similarly to the above third through fifth embodiments, the O-rings 49*a* and 49*b* are disposed.

The vibration control unit 70 shown in FIGS. 7A and 7B, when it is used, is fixed to a floor or a base through the disc 73, and instrument, a structure and a vibration suppression mass body are disposed on the disc 71. At this time, since the vibration control bodies 41*a* through 41*f* are supported by the discs 71, 72 and 73, the vibration control unit 70 can be simply disposed at a desired place. In addition, since the O-rings 49*a* and 49*b* are disposed, when the tilt angle of the vibration control body 41 becomes larger, a larger restoring force can be generated. Accordingly, when compared with the case where the stroke is limited to a smaller one by use of, for instance, a stopper, deterioration of performance of the vibration control body 41 can be made less.

Furthermore, the vibration control unit 70 according to the present embodiment, being disposed serially in two tiers, can further improve the vibration suppression effect. Still furthermore, by disposing three or more vibration control bodies in parallel in each tier, force from an object being placed is dispersed, and thereby a stable support can be realized.

In the present embodiment, although the vibration control bodies are disposed serially in two tiers, these can be disposed serially in three or more tiers. Furthermore, the number of the vibration control bodies that are disposed in parallel in a tier can be arbitrarily changed.

Furthermore, in the vibration control unit 70 according to the present embodiment, upward the disc 71 or downward the disc 73, a mechanism such as an air spring, a coil spring, or a rubber unit may be disposed to dampen the vibration transmission in a vertical direction. Thereby, a characteristic frequency in a vertical direction is lowered, and an excellent vibration suppression effect can be attained both in horizontal and vertical directions.

Figure 8:
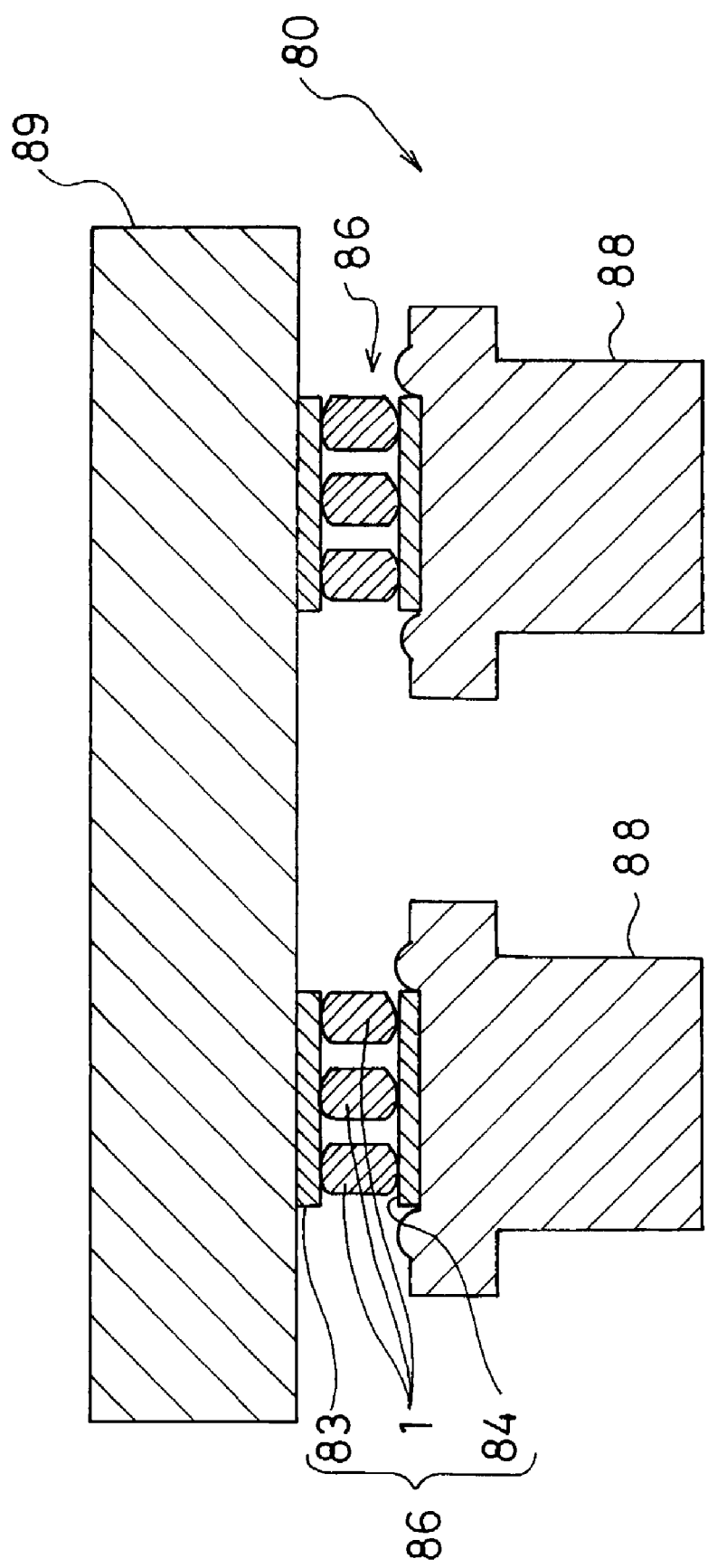
FIG. 8 is a longitudinal sectional view of a vibration control unit according to a seventh embodiment of the present invention.

Next, a seventh embodiment of the present invention will be explained with reference to FIG. 8. FIG. 8 is a longitudinal sectional view of a vibration control unit according to the present embodiment and an object that is supported thereby and is intended to be vibration-removed. A vibration control unit 80 shown in FIG. 8 comprises a plurality of laminate bodies 86 in each of which a plurality (three in an example of FIG. 8) of vibration control bodies 1 is disposed between two discs 83 and 84, and a plurality of air springs 88, respectively, disposed below the plurality of laminate bodies 86. The object to be vibration-removed 89 is supported by a plurality of discs 83 disposed above the vibration control body 1 in each laminate body 86.

Thus, since in the vibration control unit 80 of the present embodiment, the air springs 88 are disposed outside the discs 84, a characteristic frequency in a vertical direction can be lowered owing to elasticity of the air spring 88, and thereby vibration transmission in an axial direction of the vibration control body 1 can be dampened.

Furthermore, in the vibration control unit 80 of the present embodiment, since three vibration control bodies 1 are disposed between two discs 83 and 84 and a stable support surface is formed, the air springs 88 do not cause deformation in a rotational direction and a stable three dimensional support mechanism can be obtained.

Figure 9:
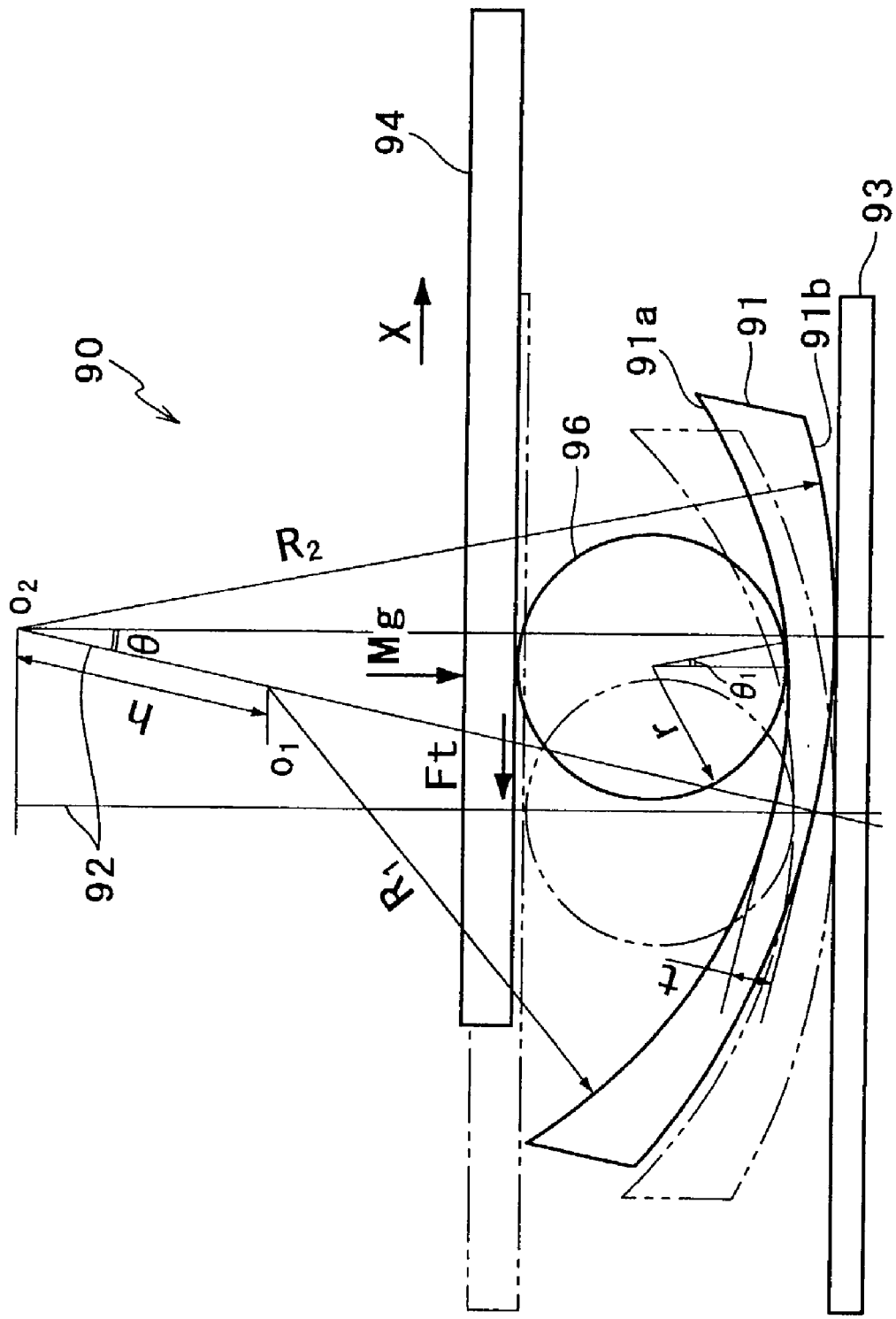
FIG. 9 is a side view of a vibration control body according to an eighth embodiment of the present invention and a vibration control unit including the same.

FIG. 9 is a side view of a vibration control body according to an eighth embodiment of the present invention and a vibration control unit including the same. A vibration control unit 90 shown in FIG. 9 includes a rolling element 91 that is a vibration control body, two plane tables (bottom surface plate 93 and top surface plate 94) that sandwich the rolling element 91, and an intermediate ball 96 (radius: r) disposed between the rolling element 91 and the top surface plate 94. The rolling element 91 has a curved disc-like shape so as to be convex into the bottom surface plate 93 side. However, while a top surface (concave surface 91*a*) that comes into contact with the intermediate ball 96 of the rolling element 91 is formed into a spherical surface having a radius R1 with a point O1 that is on a central axis 92 of the rolling element 91 and located upward the top surface plate 94 as a center, a bottom surface (convex surface 91*b*) that comes into contact with the bottom surface plate 93 is formed into a spherical surface having a radius R2 (R2>R1) with a point O2 that is on the central axis 92 of the rolling element 91 and located upward the top surface plate 94 as a center. The point O2 is separated from the point O1 by a distance h. That is, when a thickness on the central axis 92 of the rolling element 91 is set t, t+R1+h=R2 holds. In addition, owing to the difference of radii of the concave surface 91*a* and the convex surface 91*b*, as goes far from the central axis 92, the thickness of the rolling element 91 becomes larger. The vibration control unit 90 including the vibration control body 91 can be applied to vibration removal apparatus, vibration isolation apparatus, vibration immunity apparatus or vibration suppression apparatus, or part thereof.

FIG. 9 shows a state where when the top surface plate 94 thereon an object having a mass M is placed is displaced by x in a horizontal direction, the rolling element 91 is tilted. As the rolling element 91 tilts, it rolls with respect to the bottom surface plate 93. Accompanying this, the intermediate ball 96 rolls with respect to the rolling element 91 and the top surface plate 94. At that time, since a contact point (weight working point) between the concave surface 91*a* of the rolling element 91 and the intermediate ball 96 is displaced from a contact point (weight working point) between the convex surface 91*b* of the rolling element 91 and the bottom surface plate 93 in a horizontal direction, a restoring moment is generated so as to restore the tilt of the rolling element 91. Accordingly, the top surface plate 94 restores its original position.

In order to generate the restoring moment as mentioned above, h (=R2−R1−t)>0 has to hold. Accordingly, in considering that t does not become negative, it is required that R2−R1>t holds in the rolling element 91.

In the following, a principle of operation of the vibration control unit 90 will be explained. The following explanation holds similarly even when the vibration control unit 90 is disposed upside down, that is, the bottom surface plate 93, the rolling element 91, the intermediate ball 96 and the top surface plate 94 are disposed in turn from the above.

Let's take an amount of displacement in a horizontal direction of the top surface plate 94 as x, an angle that a vertical line forms with a central axis 92 as θ, and an angle that a line connecting a center of the intermediate ball 96 and a contact point with the rolling element 91 forms with a vertical line as θ1. Between these, relationship such as shown in the following formula (12) holds.

$$x = R_1(\theta+\theta_1) - r\sin\theta_1 + R_2\theta - (h\sin\theta - (R_1-r)\sin\theta_1) \qquad (12)$$

Furthermore, when a force Mg (gravity applied on an object having a mass M) is applied through the top surface plate 94 from top down vertically on the intermediate ball 96, and a force Ft is applied from the top surface plate 94 in a horizontal direction, from a balance between forces applied on the intermediate ball 96, the following formula (13) can be obtained.

$$F_t = \frac{Mg\sin\theta_1}{1+\cos\theta_1} \quad (13)$$

On the other hand, from a balance of forces applied on the rolling element 91, the following formula (14) is obtained. Here, the following relationship of a formula (15) is employed as λ.

$$\frac{\theta_1}{\theta} = \frac{2h}{R_2+R_1-h} \text{ or } \theta_1 = \frac{2h}{R_2+R_1-h}\theta = \lambda\theta \quad (14)$$

$$\lambda = \frac{2h}{R_2+R_1-h} \quad (15)$$

Let's consider a dynamic equation with respect to the top surface plate 94. When a force that moves the top surface plate 94 in a horizontal direction is the above force Ft (reaction from the intermediate ball 96) alone, from the formula (13), a dynamic equation shown in the following formula (16) is obtained.

$$M\ddot{x} + \frac{Mg\sin\theta_1}{1+\cos\theta_1} = 0 \quad (16)$$

When the formula (12) is transformed with the relationship of formula (14), an amount of displacement x of an object having a mass M in a horizontal direction can be expressed with the following formula (17). Furthermore, by differentiating this with time t, formula (18) can be obtained.

$$x = R_1(1+\lambda)\theta + R_2\theta + (R_1-2r)\sin\lambda\theta - h\sin\theta \quad (17)$$

$$\ddot{x} = [R_1(1+\lambda) + R_2 + \lambda(R_1-2r)\cos\lambda\theta - h\cos\theta]\ddot{\theta} \quad (18)$$
$$+ [h\sin\theta - \lambda^2(R_1-2r)]\dot{\theta}^2$$

When substituting the formulas (14) and (18) for the formula (16) and higher order terms are omitted, the following formula can be obtained.

$$M[R_1(1+\lambda) + R_2 + \lambda(R_1-2r)\cos\lambda\theta - h\cos\theta]\ddot{\theta} + \frac{Mg\sin\lambda\theta}{1+\cos\lambda\theta} = 0 \quad (19)$$

When assuming that θ and θ1 are very small, we can approximate that sin θ=θ, cos θ=1, sine (λ×θ)=λ×θ, and cos (λ×θ)=1, and the formula (19) becomes the following formula.

$$[R_1(1+\lambda) + R_2 + \lambda(R_1-2r) - h]\ddot{\theta} + \frac{g\lambda\theta}{2} = 0 \quad (20)$$

Similarly to the formula (9), a general solution obtained from the dynamic equation of the formula (20) shows a natural vibration and a characteristic frequency f thereof in a horizontal direction thereof can be expressed with the following formula (21).

$$f = \frac{1}{2\pi}\sqrt{\frac{gh}{(R_1+R_2-h)^2 + 4h(R_1-r)}} \quad (21)$$

As obvious from the formula (21), a characteristic frequency f in a horizontal direction of an object having a mass M is determined by radii R1 and R2 of the concave surface 91a and the convex surface 91b, an offset distance h between the point O1 and point O2, and a radius r of the intermediate ball 96, and does not depend on the mass M. Accordingly, by appropriately setting shapes of the rolling element 91 and the intermediate ball 96 (for instance, the radii R1 and R2 are made larger, the offset distance h is made smaller, or the radius r is made smaller), the characteristic frequency f can be set at a smaller value. Thereby, the vibration control unit 90 is made to have an excellent vibration isolation effect, the swinging when the bottom surface plate 93 is vibrated can be made smaller.

In particular, in the case of the rolling element 91 of the present embodiment, as apparent when referring to the formula (21) that expresses the characteristic frequency f, by making h or r smaller, without making the rolling element 91 itself so large, the characteristic frequency f thereof can be made smaller. Accordingly, a space necessary for the rolling element 91 can be made relatively small. In addition, the characteristic frequency f thus set does not change even when a mass of an object being disposed thereon changes. Accordingly, by applying the vibration control unit 90 to the vibration removal apparatus, the vibration immunity apparatus, or the vibration suppression apparatus, without depending on the mass of the object being placed thereon, always identical vibration control effect can be expected.

Furthermore, the rolling element 91 and the intermediate ball 96 can be configured, not of an elastic body such as the laminate rubber, only of a material having high stiffness such as stainless steel. Accordingly, since the rolling element 91 and the intermediate ball 96 do not substantially undergo the shear deformation, the object being placed thereon can be stably supported.

In addition, in the present embodiment, by use of the intermediate ball 96, since the characteristic frequency f of the vibration depends further on the radius r of the intermediate ball 96, the characteristic frequency f can be determined with more flexibility.

As a modified example of the present embodiment, the convex surface 91b is formed not into a spherical surface, but is formed so as to have an area of which curvature radius increases continually as departs from the central axis 92. By thus implementing, since when the tilt angle of the rolling element 91 becomes larger, a larger restoring force can be generated, when compared with the case where the stroke is limited to smaller one by the use of, for instance, a stopper, the performance of the rolling element 91 is less deteriorated.

Furthermore, as another modified example, the intermediate ball 96 does not roll with respect to the rolling element 91 and the top surface plate 94, but may slide with relatively small friction force. In this case also, since the rolling element 91 rolls with respect to the bottom surface plate 93, an effect substantially identical to the present embodiment can be obtained. For the intermediate ball 96 to slide with respect to the rolling element 91 and the top surface plate 94, the top surface plate 94 is necessary to be a concave surface.

Still furthermore, as a still another modified example, the O-ring 49a as shown in FIG. 4 may be used in the present embodiment. The O-ring is disposed on the bottom surface plate 93 below an end portion of the rolling element 91. Since the O-ring generates a larger restoring force when the tilt angle of the vibration control body becomes larger, when compared with the case where the stroke is limited to smaller one by use of a stopper, the performance of the rolling element 91 is less deteriorated.

Furthermore, the rolling element 91, though capable of vibrating in two arbitrary directions in a horizontal plane, may be configured so as to vibrate only in one direction in a horizontal plane. When the rolling element 91 is allowed vibrating only in one direction in the horizontal plane, a combination of a plurality thereof allows vibrating in two or more arbitrary directions in the horizontal plane.

Figure 10A:
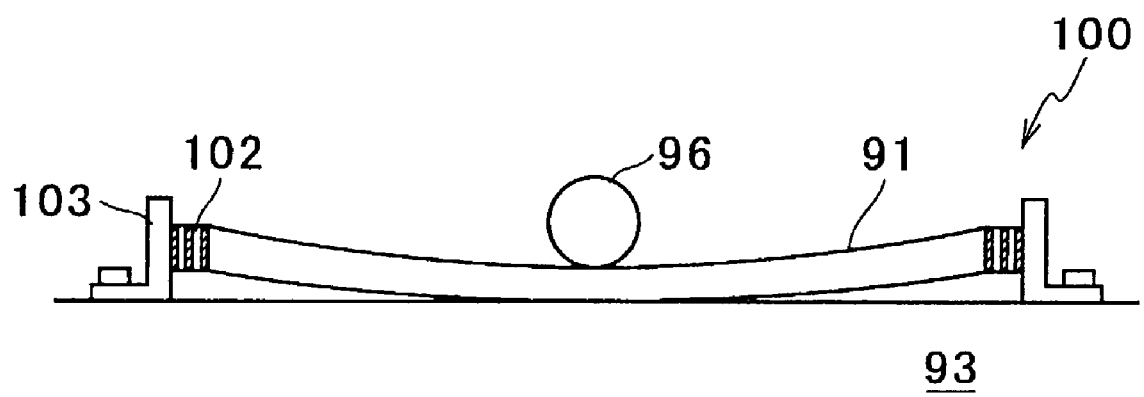
FIG. 10A is a side view of a vibration control unit according to a ninth embodiment of the present invention.
Figure 10B:
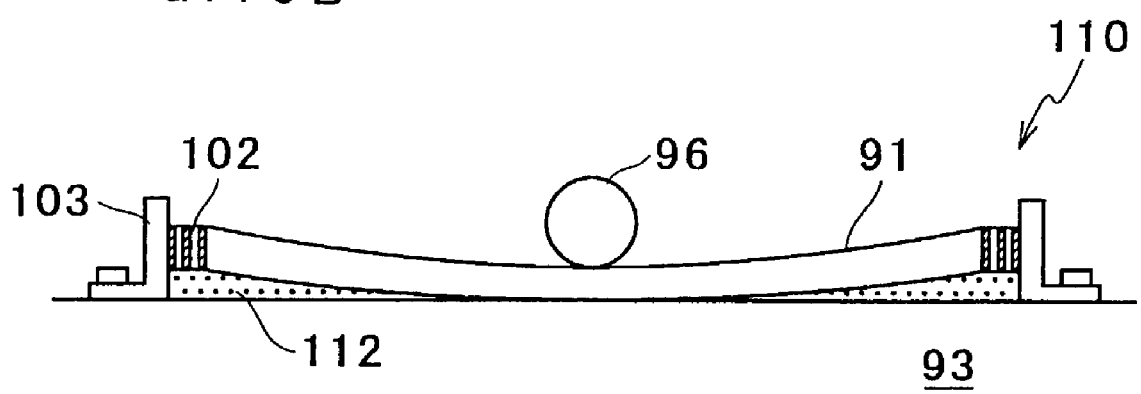
FIG. 10B is a side view of a vibration control unit according to a tenth embodiment of the present invention.
Figure 10C:
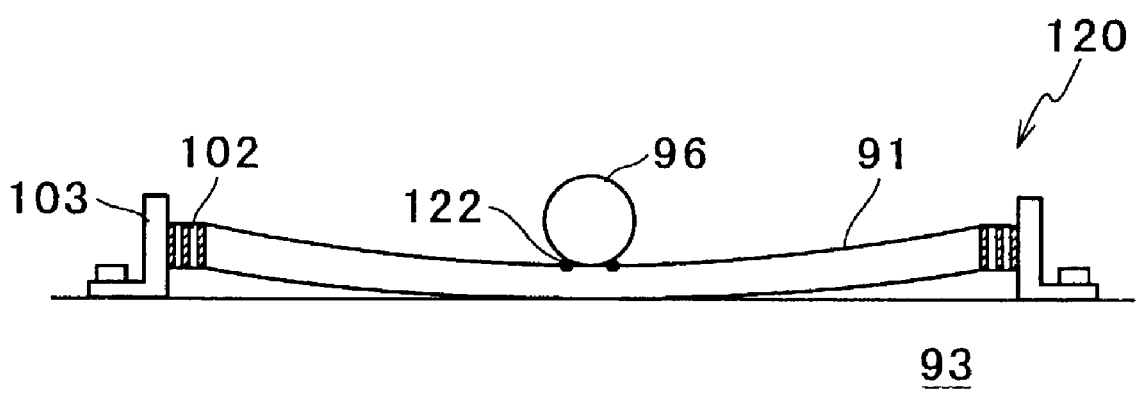
FIG. 10C is a side view of a vibration control unit according to an eleventh embodiment of the present invention.

Next, a ninth embodiment of the present invention will be explained with reference to FIG. 10A. Since a vibration control unit 100 according to the present embodiment has a configuration similar to that of FIG. 8, the common portions are given the identical reference numerals and explanations thereof will be omitted. In FIG. 10A and FIGS. 10B and 10C. described later, a top surface plate 94 is omitted in the drawings.

The vibration control unit 100 according to the present embodiment, except for a laminate ring 102 that is fixed through a fixture 103 to the bottom surface plate 93 is attached to a outer periphery of the rolling element 91, is configured similar to the eighth embodiment. Accordingly, the vibration control unit 100 has the benefits identical to the vibration control unit 90 according to the eighth embodiment.

The laminate ring 102 is one obtained by alternately laminating a gel-like material that is a visco-elastic body and a metal. Since the laminate ring 102 works as a positioning mechanism and attenuation mechanism of the rolling element 91, the rolling element 91 can be maintained in the neighborhood of a predetermined position and an angle of vibration can be suppressed to smaller than a minute angle. Furthermore, the vibration of the rolling element 91 can be rapidly attenuated. Still furthermore, the laminate ring 102 has an advantage of inhibiting dust from entering. As a modified example of the present embodiment, in place of the laminate ring 102, a member having an attenuation effect such as the gel-like material that is a visco-elastic body or the like may be formed in ring and can be used.

Next, a tenth embodiment of the present invention will be explained with reference to FIG. 10B. A vibration control unit 110 according to the present embodiment has a configuration similar to those of FIG. 8 and FIG. 9, and common portions thereof are given the same reference numerals and explanations thereof will be omitted.

The vibration control unit 110 according to the present embodiment is different from the vibration control unit 100 according to the ninth embodiment explained in FIG. 10A only in that silicone oil 112 that is a visco-elastic body is filled between the rolling element 91 and the bottom surface plate 93. Accordingly, the vibration control unit 110, in addition to benefits due to the vibration control unit 100 of the ninth embodiment, has a further benefit in that an attenuation effect of the vibration is larger in comparison therewith.

Next, an eleventh embodiment of the present invention will be explained with reference to FIG. 10C. A vibration control unit 120 according to the present embodiment has a configuration similar to those of FIG. 8 and FIG. 9, and common portions thereof are given the same reference numerals and explanations thereof will be omitted.

The vibration control unit 120 according to the present embodiment is different from the vibration control unit 100 according to the ninth embodiment explained in FIG. 10A only in that the rolling element 91 is placed at a position that is provided by an O-ring 122 that is an annular elastic body fixed at a concave surface center of the bottom surface plate 93. Accordingly, the vibration control unit 120 has benefits due to the vibration control unit 100 of the ninth embodiment. Furthermore, by the use of the O-ring 122, the intermediate ball 96 is hindered from rolling because of only a little vibration. Accordingly, the configuration of the present embodiment is effective when there is no necessity of removing a slight vibration of the top surface plate 94.

Next, a twelfth embodiment of the present invention will be explained with reference to respective drawings of FIG. 11. A vibration control unit 130 according to the present embodiment has a configuration similar to that of FIG. 8, and common portions thereof are given the same reference numerals and explanations thereof will be omitted.

FIG. 11A is a perspective view of the vibration control unit 130 according to the present embodiment, FIG. 11B a plan view thereof, and FIG. 11C a side view thereof. The vibration control unit 130 according to the present embodiment is one in which four pairs of the rolling element 91 and the intermediate ball 96 are disposed in parallel between the top surface plate 94 and the bottom surface plate 93. Although the eighth embodiment that is explained in FIG. 9 does not have a mechanism that stably supports the top surface plate 94, by use of four pairs (at least three) of the rolling element 91 and the intermediate ball 96 as mentioned above, without relying on other support mechanism, the top surface plate 94 can be supported with stability. Furthermore, the vibration control unit 130 according to the present embodiment has an advantage in that four rolling elements 91, together with the bottom surface plate 93 and the top surface plate 94, can be disposed simply as a unit at a desired position. In the present embodiment, each of the pairs of the rolling element 91 and the intermediate ball 96 may have each of the configurations shown in FIG. 10A, FIG. 10B and FIG. 10C.

Furthermore, as a modified example of the present embodiment, similarly to the sixth embodiment explained in each of FIG. 7, a plurality of the vibration control units 130 shown in FIGS. 11A through 11C may be serially superposed in a vertical direction. Thereby, a further vibration isolation effect can be obtained. Still furthermore, in this case, similarly to the seventh embodiment explained in FIG. 8, further outside of the top surface plate or the bottom surface plate disposed at an endmost portion, a member such as an air spring that can lower the characteristic frequency in a vertical direction and thereby can dampen the vibration transmission in an axial direction of the vibration control unit may be disposed.

In the above, preferred embodiments of the present invention have been explained, however, the present invention is not restricted to the above embodiments, within the scope of the description of the following claims, various design modifications are allowed. For instance, the shape of the rolling element or the vibration control body, without restricting to a particular ones illustrated in the drawings, can be modified into various shapes. Specifically, although the vibration control bodies according to the above embodiments are symmetrical with respect to a central axis, the vibration control body of the present invention is not necessarily formed symmetrically with respect to the central axis. Still furthermore, in the vibration control bodies according to the above embodiments, although both the top end surface and the bottom end surface (concave surface and convex surface) are spherical surfaces, these surfaces may not be the spherical surface. For instance, in the case of the first through seventh embodiments, with R1 and R2, respectively, as average curvature radii of the top end surface and the bottom end surface, and with h as a distance between centers of the curved surfaces of the top end surface and the bottom end surface, the vibration control body need only be formed so as to satisfy R1+R2>H>h. Furthermore, in the case of the eighth through twelfth embodiments, with R1 and R2, respectively, as average curvature radii of the concave surface and the convex surface, and with t as a thickness at a center portion of the rolling element, the rolling element need only be formed so as to satisfy R2−R1>t.

Furthermore, although in the eighth through twelfth embodiments, the rolling elements 91 are formed in disc, the shape of the rolling element may take an arbitrary shape such as oval plate or the like. Furthermore, a plurality of the intermediate balls may be disposed between the rolling element and the top surface plate. In this case also, for the intermediate balls 96 to roll or slide with respect to the rolling element 91 and the top surface plate 94, the top surface plate 94 is necessary to be formed into a concave surface. Still furthermore, as the intermediate body, one that has a shape other than the ball can be used. Other than these, various modifications similar to the above may be applied.

[Experiment]

Figure 12:
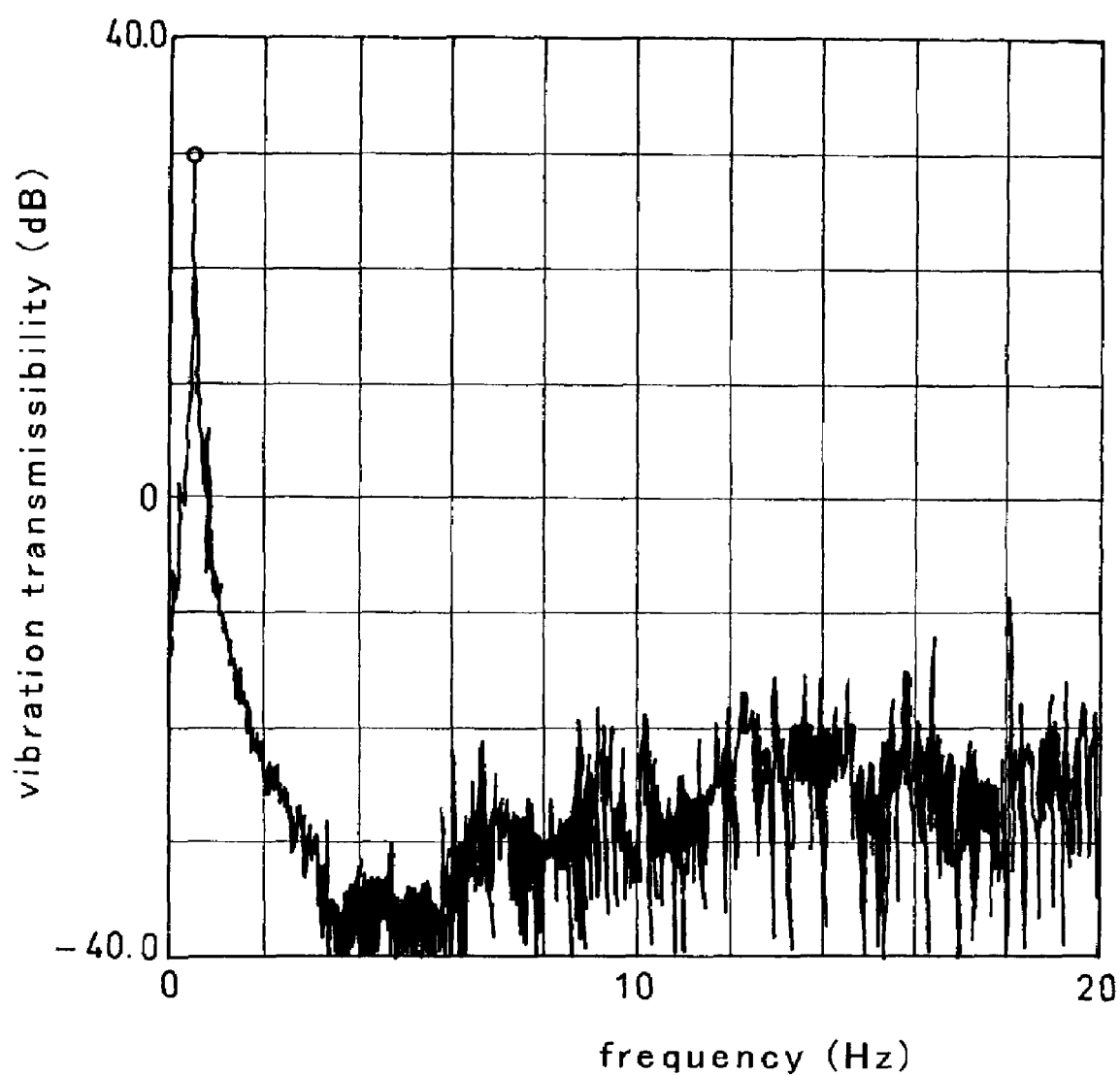
FIG. 12 is a graph showing an experimental result for confirming a vibration insulation effect of the vibration control unit according to the second embodiment.

An experiment was conducted to confirm a vibration isolation effect according to the vibration control unit 20 shown in FIG. 3. FIG. 12 is a graph depicting a result thereof, and in the graph the horizontal axis shows frequency (Hz) and the vertical axis shows vibration transmissibility (dB), that is, a ratio of output vibration to input vibration. Here, the vibration control body 21 whose radius R1 of the bottom end surface 23 is 50 mm, radius R2 of the top end surface 22 is 50 mm and overall height H is 93 mm is used for the experiment.

As obvious from FIG. 12, it is found that the vibration control unit 20 used for this experiment is one that has a relatively small characteristic frequency of 0.5 Hz, and can lower the vibration transmissibility in the frequency larger than substantially 0.7 Hz.

What is claimed is:

1. A vibration control unit, comprising:
   a rolling element having a first curved surface that is curved in three dimensions, of constant radius, and convex is interposed between a first member and a second member and capable of rolling with respect to the first member on the first curved surface of the rolling element;
   wherein the rolling element has a second curved surface that is curved in three-dimensions, of constant radius, and faces the first curved surface and is formed of a curved surface center different from that of the first curved surface;
   wherein the rolling element is configured so that as the rolling element, resulting from an additional force applied on the first and second curved surfaces, rolls with respect to the first member, the second member vibrates with a restoring force that is determined based on an average curvature radius of the first and second curved surfaces of the rolling element and a distance between the curved surface centers of the first and second curved surfaces; and
   wherein the rolling element is axially symmetric with respect to a central axis that extends in a direction between the first curved surface and the second curved surface.

2. The vibration control unit as set forth in claim 1, wherein the second curved surface is a convex surface; and wherein the rolling element is capable of rolling with respect to the first member in the first curved surface and at the same time capable of rolling with respect to the second member in the second curved surface.

3. A vibration control body comprising:
   wherein the vibration control body is formed so that an overall height thereof is H, and first and second curved surfaces thereof that are convex surfaces curved in three dimensions that face to each other satisfy R1+R2>H>h (R1 and R2, respectively, denote constant radii of the first and second curved surfaces, and h denotes a distance between curved surface centers of the first and second curved surfaces);
   wherein only one curvature radius is respectively defined at the intersection of the first curved surface and a central axis and at the intersection of the second curved surface and a central axis, and
   wherein the vibration control body is axially symmetric with respect to a central axis that extends in a direction between the first curved surface and the second curved surface.

4. A vibration control body as set forth in claim 3, wherein the vibration control body is formed symmetrically with respect to a central axis, and the first and second curved surfaces thereof are spherical surfaces formed at both ends of the central axis so as to satisfy R1+R2>H>h (R1 and R2, respectively, denote radii of the first and second curved surfaces, and h denotes a distance between curved surface centers of the first and second curved surfaces).

5. A vibration control unit comprising:
   one or a plurality of vibration control bodies as set forth in claim 3,
   wherein at least the second curved surface of the first and second curved surfaces of one or a plurality of vibration control bodies is supported with a plate member.

6. The vibration control unit of claim 1 wherein the first curved surface is a spherical section.

7. The vibration control unit of claim 1 wherein the second curved surface is a spherical section.

* * * * *